Jan. 18, 1955  G. L. CALLERY ET AL  2,699,960
CASING FOR COLLECTING LEAKAGE FROM A PIPE COUPLING
Filed Oct. 10, 1951
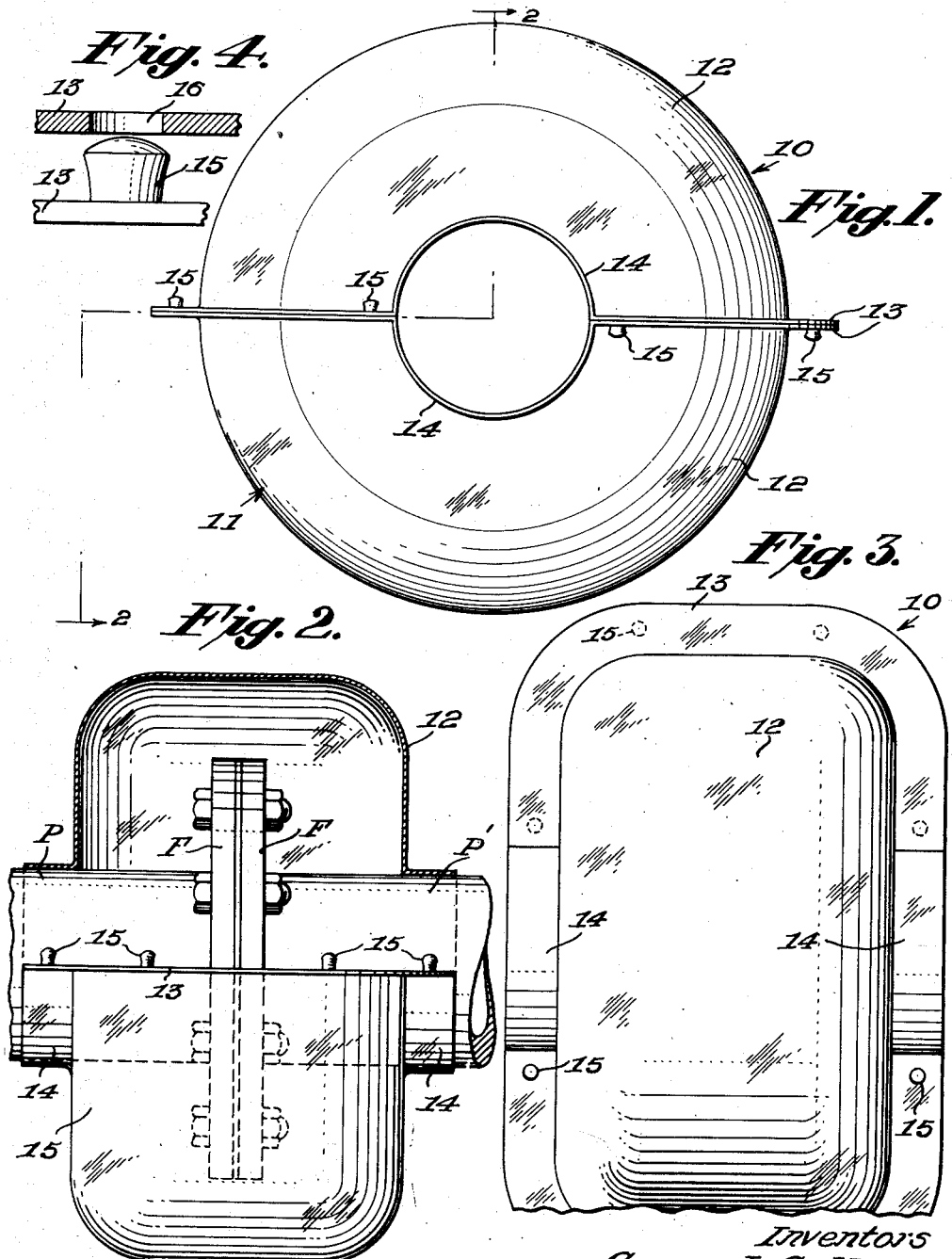
Inventors
George L. Callery
and Alonzo White, III
by James Askins
Attorney.

United States Patent Office 2,699,960
Patented Jan. 18, 1955

2,699,960

CASING FOR COLLECTING LEAKAGE FROM A PIPE COUPLING

George L. Callery, New Castle, Del., and Alonzo White III, Landenberg, Pa.

Application October 10, 1951, Serial No. 250,759

1 Claim. (Cl. 285—99)

This invention relates to a casing for collecting leakage from a pipe coupling.

The invention is more particularly concerned with a shield which is engageable with a pipe or the like in enclosing relation to a coupling or other structure in the pipe, and which is adapted to collect and prevent spraying of any fluid that may leak through the coupling or other structure in the pipe.

The problem of leaking pipe joints or other connections has heretofore been given consideration, and prior shield structures have been provided for collecting and preventing spraying of any liquids or gases that may escape from joints or connections in pipe lines.

While such prior shields satisfied their requirements to the extent of collecting and preventing spraying of liquids or gases escaping from connections in pipe lines equipped therewith, they failed to provide any warning of initial leakage of the connections, for the reason that they were constructed of opaque material and thereby totally concealed the connections from visual inspection.

Furthermore, such prior constructions required separate fastening means for the cooperating sections thereof which has been found objectionable for the particular reason that corrosion is set up between the shield and the fastening means which sooner or later may result in leakage of the shield.

A primary object of this invention is to provide a shield for connection in pipe lines or the like, which is transparent and translucent, whereby the shield is capable not only of collecting and preventing spraying of escaping fluids but it further admits of ready visual detection of any leakage in the connection enclosed by the shield.

A further object of the invention is to provide a shield including cooperating half sections which include unitary fastening means, the fastening means being so disposed on the sections that any pair thereof can be readily connected in encircling relation to a pipe joint or other leakable connection.

Other objects and advantages of the invention will become apparent in the course of the following detailed description, taken in connection with the accompanying drawing, wherein Figure 1 is a side elevational view of the improved shield in accordance with a preferred structural embodiment thereof.

Figure 2 is a view partially in edge elevation and partially in axial section as observed in the spaced vertical planes indicated by line 2—2 on Fig. 1, the shield being shown in operative position in a pipe line in this figure.

Figure 3 is a broken top plan view of the shield.

Figure 4 is a fragmental view on a substantially enlarged scale and particularly illustrating the improved fastening means for the two half sections of the shield.

Referring now in detail to the drawing, the improved shield comprises a pair of cooperating sections 10 and 11 which are identical in form and construction. The sections are molded from a transparent or translucent plastic material which is substantially thin, and each section includes a body portion 12 which is semi-circular in side elevation and substantially hat-crown shape in axial section, as is seen in Fig. 2.

Each section is further provided with a base flange 13 which includes a pipe-encircling semi-circular portion 14.

The two sections 10 and 11 are assembled with their flanges 13 in face-to-face contact in a plane including the axis of the shield, as is clearly indicated in Fig. 1, and novel connecting means for the flanges are provided whereby the sections may be expeditiously connected or disconnected, as will later appear.

The flange 13 on each section 10, 11 is provided with a plurality of buttons 15 at one side of the axis of the shield, and a like number of holes 16 at the opposite side of the axis. The sections are identical including the fastening means, whereby any two thereof may readily be buttoned together by proper turning of the sections through an angle of 180° in a horizontal plane. The buttons 15 are integral with the section flanges and accordingly the connecting means can never be lost.

As is more clearly indicated in Fig. 4, the buttons 15 have enlarged and rounded outer ends which are of greater diameter than that of the holes 16. In securing the sections together with their flanges 13 in contact, the plastic material in the buttons and to some extent in the walls of the button holes will yield sufficiently to permit entry of the buttons into the holes under pressure, and the reaction of the stressed material will firmly retain the sections in assembled relation. However, the improved connections permit disassembly of the sections for removal of the shield from a pipe line or the like.

In Fig. 2 the improved shield is shown in operative relation to a pipe line wherein the curved flange portions 14 engage the pipes P, P' and the pipe flanges F are enclosed within the shield.

Since the pipe flanges F are of substantially greater diameter than that of the pipes P, P', the body portions 12 are of substantial depth and, as indicated on the drawing, the radial depth of such portions is substantially equal to the diameter of the semi-circular pipe encircling flanges 14.

The improved shield as assembled in Fig. 2 will collect any fluid escaping from the joint between the pipe flanges. However, by forming the shield of transparent or translucent material, the joint can be observed at frequent intervals and any leak therein can be corrected before the shield becomes filled with the leaking fluid or the joint fails.

While the buttons 15 retain the sections in assembled relation under substantial separating influence, they do, however, permit the sections to be separated with little effort for repairing a joint or removing any escaped fluid from the shield.

The improved shield may be fitted with a conduit connection on the underside whereby escaping fluids may be led to a drain.

While the improved shield is herein illustrated as in use with a pipe flange, it is equally applicable to various other pipe connections as well as to pump-packed glands or motor couplings between the motor and the pump.

The improved shield will find use with both liquids and gases, and will be constructed from a plastic material which will withstand the corrosive action of any particular fluid with which it is to be used.

While we have disclosed our invention in accordance with a single specific embodiment thereof, such is to be considered as illustrative only and not restrictive, the scope of the invention being defined in the following claim.

What we claim and desire to secure by U. S. Letters Patent is:

A shield for engaging adjacent ends of a pair of axially alined pipes and enclosing a pipe coupling comprising a pair of similar sections formed from light-penetrating thin plastic material, each of said sections including a back portion having axially alined semi-circular pipe-receiving openings in opposite end walls thereof, said body being of semi-circular form as viewed axially of said openings and of substantially hat-crown form as viewed at right angles to the axis of said openings, said sections each further including a continuous flange the major portion of which is in a plane of said axis and the minor portion of which comprises semi-circular portions extending about the margins of said openings, the plane flange portion of one section being engageable with the plane flange portion of the other section, the diameter of the cooperating body portions being substantally greater than said pipe-coupling for enclosing same and providing space for collection of fluid leaked through said coupling, and means unitary with said plane flange portions for removably connecting same together comprising a plurality of plastic buttons on the plane flange portion of each section at one side of said axis only, and a like plurality of button-receiving holes at the other side of said axis only, and the buttons being removably engageable within the said holes.

References Cited in the file of this patent

UNITED STATES PATENTS

| | | |
|---|---|---|
| 345,463 | Verner | July 13, 1886 |
| 1,958,436 | Hess | May 15, 1934 |
| 2,024,602 | Roberts | Dec. 17, 1935 |
| 2,336,699 | Neth et al. | Dec. 14, 1943 |

FOREIGN PATENTS

| | | |
|---|---|---|
| 22,848 | Great Britain | Nov. 7, 1905 |
| 570,067 | Germany | Jan. 26, 1933 |